J. R. McConnell,

Gang Plow.

No. 111,226.    Patented Jan. 24, 1871.

Witnesses:
S. S. Mabu
Alex. F. Roberts

Inventor:
J. R. McConnell
Per Mmm & Co
Attorneys.

UNITED STATES PATENT OFFICE.

JOHN R. McCONNELL, OF MARENGO, IOWA.

IMPROVEMENT IN GANG-PLOWS.

Specification forming part of Letters Patent No. 111,226, dated January 24, 1871; antedated January 18, 1871.

*To all whom it may concern:*

Be it known that I, JOHN R. McCONNELL, of Marengo, in the county of Iowa and State of Iowa, have invented a new and useful Improvement in Gang-Plows; and I do hereby declare that the following is a full, clear, and exact description of the invention, which will enable others skilled in the art to make and use the same, reference being had to the accompanying drawings, forming part of this specification.

Figure 1:
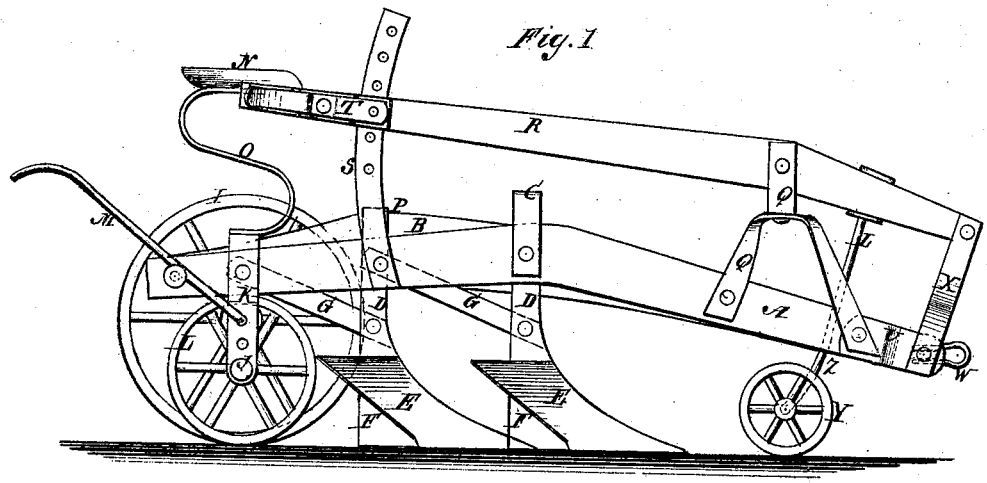
Figure 2:
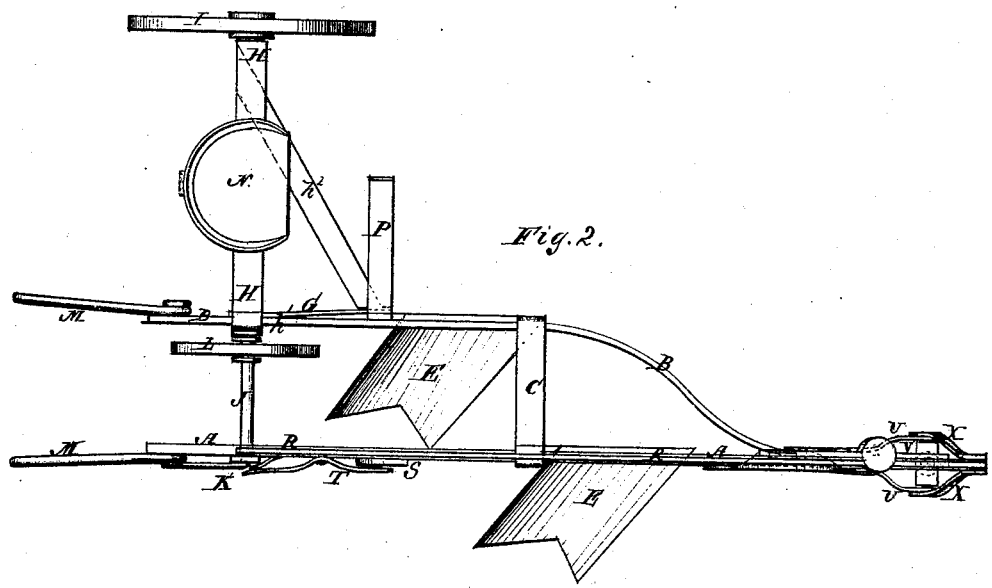

Figure 1 is a side view of my improved gang-plow. Fig. 2 is a top view of the same.

Similar letters of reference indicate corresponding parts.

My invention has for its object to furnish an improved gang-plow, which shall be so constructed and arranged that it may be conveniently adjusted to work at any desired depth, or to cut a wider or narrower furrow, as may be desired; and it consists in the construction and combination of the various parts, as hereinafter more fully described.

A is the plow-beam upon the plowed side of the machine, which is made with an angle in its middle part, and inclines slightly downward toward each end, as shown in Fig. 1.

B is the plow-beam upon the landside side of the plow, the rear part of which is parallel with the rear part of the beam A, and has an angle in it about midway between the angle of the beam A and the rear end of the two beams, at about the point at which the plow-standard is attached to said beam B.

C is a cross-bar, the ends of which are bent downward. One end of the bar C is attached to the outer or plowed side of the beam A at or near its angle. The other end of the cross-bar C is bolted to the landside of the beam B. From the point or about the point of attachment of the cross-bar C the beam B curves toward the beam A until its forward end meets the forward end of the beam A, to which it is securely bolted.

D are the plow-standards, the upper ends of which are securely bolted to the beams A B at or near the angles of said beams, and to the lower ends of which the plows are attached. E are the mold-boards of the plow. F are the landsides of the plow, which are made short and high and without any opening through them. The draft-strain upon the plow-standards D is supported by the braces G, the forward ends of which are bolted to the said standards D, and the rear ends of which are attached to the rear parts of the beams A B, as shown in Fig. 1. By this construction the plows are protected against becoming clogged while at work.

H is a bar, the ends of which are bent downward, and to the outer end of which is attached an axle, upon which revolves the wheel I, which wheel I may be of any suitable size, and rolls upon the unplowed land. The other downwardly-projecting end of the bar H is bolted to the inner or off side of the rear part of the beam B, projects beneath said beam to form a standard, $h'$, and has several holes formed in it to receive the axle J, the other end of which is secured in one of the holes in the standard K, the upper end of which is bolted to the rear part of the beam A.

L is a wheel, which is placed and revolves upon a journal formed upon the axle J in such a position that the said wheel may roll along the bottom of the furrow opened by the rear plow.

The draft-strain upon the outer end of the bar H is sustained by the brace $h^2$, the outer or rear end of which is secured to the outer part of the said bar H, and the forward end of which is secured to the beam B or brace G.

M are the plow-handles, which are secured to the rear ends of the beams A B.

N is the driver's seat, which is attached to a spring, O, and is supported by the bar H, to which the said spring is attached.

P is an arm or bar, the inner end of which is turned downward, and is bolted to the beam B in such a position that the said bar may serve as a foot-rest for the driver.

Q is a bar, the lower end or part of which is made branched or U-shaped, and is attached to the forward part of the beam A.

To the upper end of the bar Q is pivoted the lever R, which extends back into such a position that its rear end may be reached and operated by the driver from his seat.

To the side of the rear part of the lever R is attached a keeper, through which passes a curved bar, S, the lower end of which is attached to the beam A, and which has numerous holes formed through it to receive the pin of the lever spring-catch T, attached to the rear part of the lever R, so as to hold the said lever securely in any position into which it may be adjusted.

To the forward ends of the beams A B are pivoted the rear ends of the short bars U, which are curved outward and forward, and in the forward ends of which are formed holes, in which work the journals formed upon the ends of the short flat bar V, which has several holes formed in it to receive the bolt of the draft hook, link, or clevis W, so that the point of draft attachment may be moved laterally, as may be required to regulate the width of the furrow.

To the forward end of the lever R are pivoted the upper ends of the short bars X, which are curved outward and downward, and have holes formed in their lower ends to receive the journals of the bar V, so as to pivot the bars X to the bars U. By this construction, by operating the lever R the forward ends of the plow-beams may be raised and lowered by the driver from his seat to cause the plows to run deep or shallow in the ground, or to raise them entirely out of the ground, as may be desired.

Y is a caster-wheel, the standards Z of which pass up through keepers attached to the forward parts of the beams A B and lever R, and is connected with said lever by collars, stop-pins, or other means, so as to support the said lever, and through it and its connections the forward end of the beams A B, as shown in Fig. 1.

Having thus described my invention, I claim as new and desire to secure by Letters Patent—

The arrangement, in a gang-plow and with respect to a wheel, I, and shaft H, of the wheel L, and the shaft J, adjustable in the apertured standards h' K, as shown and described, and for the purpose specified.

JOHN R. McCONNELL.

Witnesses:
  JOHN R. SERRIN,
  A. J. MORRISON.